United States Patent [19]

Kurosaki et al.

[11] 4,389,233

[45] Jun. 21, 1983

[54] PROCESS FOR THE PRODUCTION OF AN OPTICAL GLASS ARTICLE

[75] Inventors: Shiro Kurosaki; Minoru Watanabe, both of Yokohama, Japan

[73] Assignee: Sumitomo Electric Industries, Ltd., Osaka, Japan

[21] Appl. No.: 301,895

[22] Filed: Sep. 11, 1981

[30] Foreign Application Priority Data

Sep. 17, 1980 [JP] Japan .................................. 55-129817
Sep. 17, 1980 [JP] Japan .................................. 55-129818

[51] Int. Cl.$^3$ ............................................. C03C 15/02
[52] U.S. Cl. ......................................... 65/31; 65/3.11; 65/3.15; 65/30.13; 501/12
[58] Field of Search ...................... 65/30.13, 31, 30.1, 65/3.11, 3.15; 501/12

[56] References Cited

U.S. PATENT DOCUMENTS

| | | | |
|---|---|---|---|
| 3,640,093 | 2/1972 | Levene et al. | 501/12 X |
| 4,059,658 | 11/1977 | Shoup et al. | 264/43 |
| 4,110,093 | 8/1978 | Macedo et al. | 65/31 X |
| 4,112,032 | 9/1978 | Blaszyk et al. | 264/42 |
| 4,317,668 | 3/1982 | Susa et al. | 65/30.1 X |

FOREIGN PATENT DOCUMENTS 2447353  4/1976  Fed. Rep. of Germany ........ 501/12

*Primary Examiner*—Robert L. Lindsay, Jr.
*Attorney, Agent, or Firm*—Wenderoth, Lind & Ponack

[57] ABSTRACT

This invention relates to a process for the production of an optical glass article, which comprises neutralizing an aqueous solution containing silicic acid to form a porous gelled body, removing soluble materials from the porous gelled body to form a porous glass body, stuffing the porous glass body with a solution containing at least one compound capable of being converted into an oxide dopant for changing the refractive index of the glass body, selected from the group consisting of $CsNO_3$, $RbNO_3$ and $TlNO_3$, unstuffing the glass body with a solvent or solution having a suitable composition at a suitable temperature to leach the compound out of the outside glass body and to give a predetermined concentration distribution in the micropores of the glass body, optionally immersing the unstuffed body in an organic solvent, precipitating the compound in the micropores, drying the glass body in a predetermined atmosphere to decompose the compound, further heating at a higher temperature, and then firing at a temperature sufficiently high to completely decompose the compound and to completely burn the organic materials, but lower than the melting point of silica.

37 Claims, No Drawings

PROCESS FOR THE PRODUCTION OF AN OPTICAL GLASS ARTICLE

BACKGROUND OF THE INVENTION

1. Field of the Invention

This invention relates to a process for the production of an optical glass article and more particularly, it is concerned with a process for producing a lens material having a three dimensional refractive index distribution inside the lens, which can be used as a lens for a camera, precision optical device or optoelectronic instrument. Furthermore, this invention relates to a rod lens which having a refractive index which varies in the radius direction as a lens of the refractive index distribution type.

2. Description of the Prior Art

Rod lenses of graded refractive index distribution type (which will hereinafter be referred to as "rod lens of graded type") having a parabolic distribution of the refractive index, whose refractive index lowers gradually from the center to the outside in the radius direction, have lately been used increasingly as optical parts in duplicating machines, facsimile devices and optical communications. These rod lenses are made of glass materials or plastic materials and some of them have been put to practical use ("Nikkei Electronics" 1979, 8/20, page 64–74, or "Kogyo Zairyo" 1980, Vol. 20, No. 10, page 85–96). In particular, Selfoc (trade mark) lenses made by the ion exchange method using multi-component glasses are well known.

However, such an ion exchange method is essentially limited by the diffusion speed of a network modifier ion playing a role of changing the refractive index under such a temperature condition that glass itself is not deformed. Thus, a cation with a high diffusion speed should be used, and, for example, a monovalent cation such as Tl, Cs, Rb, K, Na or Li ion can only be used as the network modifier ion. Therefore, it is not easy to reduce the dispersion of the refractive index. Tl should be used for the purpose of increasing the differences of refractive indexes, but handling Tl is difficult because of its poisonous character. Furthermore, when it is desired to prepare a rod lens with a large diameter, e.g. larger than 3 mm$\phi$, the ion exchange method is not suitable for practice on a commercial scale, since a long time is taken for ion exchange at a temperature at which glass is not deformed or broken.

In addition, the molecular stuffing method based on another principle has been proposed as a method whereby the above described disadvantages can be overcome. This is a method of making a glass rod comprising precipitating $CsNO_3$ with a concentration distribution in the micropores of a porous glass prepared through steps of phase separation, leaching out and washing, collapsing this and doping $Cs_2O$ in such a manner that the concentration of $Cs_2O$ be in a parabolic distribution from the center to the outside (Japanese Patent Application (OPI) Nos. 28339/1975 (U.S. Pat. Nos. 3,938,974 and 4,313,748), 126207/1976 (U.S. Pat. Nos. 4,110,093, 4,110,096, 4,220,682, 4,236,930 and 4,313,748) and 102324/1978 (U.S. Pat. Nos. 4,183,620, 4,188,198 and 4,299,608)).

However, these methods have the disadvantage that in a porous glass obtained by phase separation, leaching out and washing, there are disorders of the concentration distribution of $Cs_2O$ and the refractive index distribution due to the disorder of the pore diameter distribution, i.e. abnormal growth of the connected micropores formed in the step of leaching out. A further disadvantage is that since the porosity of such a porous glass is less than 50% and it is difficult to make it larger, the difference of refractive indexes amounts to at most about 2.0% in a glass body prepared by stuffing with a high concentration aqueous solution of $CsNO_3$, precipitating $CsNO_3$, unstuffing $CsNO_3$, further reprecipitating $CsNO_3$ and collapsing. Accordingly, various efforts have been made to overcome the disadvantages and to develop a porous glass having connected micropores with a desirable and uniform pore diameter distribution.

SUMMARY OF THE INVENTION

It is an object of the present invention to provide a process for the production of a material for a lens, in particular, rod lens having a desired large distribution of refractive index and being free from disorders of refractive index distribution, by the use of a porous glass from silica gel.

It is another object of the present invention to provide a lens material with a low price and a desired size.

It is a further object of the present invention to provide a rod lens of graded type with a parabolic distribution of the refractive index.

These objects can be attained by a process for the production of an optical glass article, which comprises neutralizing an aqueous solution containing silicic acid to form a porous gelled body, removing soluble materials from the porous gelled body to form a porous glass body, stuffing the porous glass body with a solution containing at least one compound capable of being converted into an oxide dopant for changing the refractive index of the glass body, selected from the group consisting of $CsNO_3$, $RbNO_3$ and $TlNO_3$, unstuffing the glass body with a solvent or solution having a suitable composition at a suitable temperature to leach the compound out of the glass body and to give a predetermined concentration distribution in the micropores of the glass body, optionally immersing the unstuffed body in an organic solvent such as ethanol or propanol, precipitating the compound in the micropores, drying the glass body in a predetermined atmosphere to decompose the compound, further heating the glass body at a higher temperature, and then firing it at a temperature sufficiently high to completely decompose the compound and to completely burn the organic materials, but lower than the melting point of silica.

DETAILED DESCRIPTION OF THE INVENTION

In the present invention, a porous glass is prepared by the silica gel method and is subjected for use as a lens, in particular, rod lens with a predetermined refractive index distribution. We have noticed that the porous glass obtained by the silica gel method is free from disorders of pore diameter distribution and a relatively large porosity is obtained, and have succeeded in obtaining a glass body with a desired distribution of the refractive index by applying the molecular stuffing method to the porous glass.

As a method of preparing a porous glass, there are the vycor method, zeolite method, white carbon method, colloidal silica method and silica gel method. This silica gel method is classified into (1) a method comprising adding an acid to an aqueous solution of sodium silicate, stirring vigorously at a low temperature to form a silica hydrogel, gelling, forming and then leaching, and (2) another method comprising adding an organic compound capable of undergoing the Cannizzaro reaction to a solution of an alkali metal silicate, stirring, heating somewhat to advance the reaction gradually, gelling, forming and leaching, as disclosed in Japanese Patent Application (OPI) Nos. 115191/1975 (U.S. Pat. No. 4,112,032), 119512/1979 (U.S. Pat. No. 4,220,461) and 116615/1980 (U.S. Pat. No. 4,230,679), and U.S. Pat. Nos. 3,678,144, 3,782,982, 3,827,893 and 4,059,658.

According to the present invention, therefore, there is provided a process for the production of an optical glass article, which comprises neutralizing an aqueous solution containing silicic acid to form a porous gelled body, removing soluble materials from the porous gelled body to form a porous glass body, stuffing the porous glass body with a solution containing at least one compound capable of being converted into an oxide dopant for changing the refractive index, selected from the group consisting of $CsNO_3$, $RbNO_3$ and $TlNO_3$, unstuffing with a solvent or solution having a suitable composition at a suitable temperature to leach the compound out of the glass body and to give a predetermined concentration distribution in the micropores, optionally immersing the unstuffed body in an organic solvent such as ethanol or propanol, precipitating the compound in the micropores, drying the glass body in a predetermined atmosphere to decompose the compound, further heating at a higher temperature, and then firing the partially leached glass body at a temperature sufficiently high to completely decompose the compound and to completely burn organic materials, but lower than the melting point of silica.

The process of the present invention is composed mainly of two technical aspects. The first consists in neutralizing an aqueous solution containing silicic acid to form a porous gelled body and removing soluble materials from the porous gelled body to form a porous glass body, and the second consists in preparing a glass article with a concentration distribution by utilizing the molecular stuffing method.

The technique of the first aspect can be embodied by the following three methods:

(A) Method by utilizing Cannizzaro Reaction

A true solution, colloidal solution or suspension is prepared containing at least one of lithium polysilicate, sodium silicate, potassium silicate, rubidium silicate, cesium silicate, thallium silicate, quaternary ammonium silicate and colloidal silica.

The use of expensive rubidium silicate, cesium silicate and thallium silicate is not so recommended. The quantity of $SiO_2$ contained therein should be in the range of 1 to 12 mols/l, since if less than 1 mol/l, the gelled body is too weak, while if more than 12 mols/l, it exceeds the solubility of $SiO_2$. The pH is generally adjusted to 10 to 15.

The above described aqueous solution can be prepared, for example, by using 6.8 wt % $Na_2O$-25 wt % $SiO_2$-balance $H_2O$ as an aqueous solution of sodium silicate, 8.3 wt % $K_2O$-20.8 wt % $SiO_2$-balance $H_2O$ as an aqueous solution of potassium silicate, 2.1 wt % $Li_2O$-20 wt % $SiO_2$-balance $H_2O$ as an aqueous solution of lithium polysilicate, 9.9 wt % quaternary ammonium ion-45 wt % $SiO_2$-balance $H_2$) as an aqueous solution of quaternary ammonium silicate, 40 wt % $SiO_2$-balance $H_2O$ as an aqueous solution of colloidal silica, 10.5 wt % $Rb_2O$-20 wt % $SiO_2$-balance $H_2O$ as an aqueous solution of rubidium silicate, 12 wt % $cs_2O$-20 wt % $SiO_2$-balance $H_2O$ as an aqueous solution of cesium silicate and 14 wt % $Tl_2O$-20 wt % $SiO_2$-balance $H_2O$ as an aqueous solution of thallium silicate. For the preparation of the above described silicate solution from these aqueous solutions, it is desirable to control the ratio of, for example, a solution of lithium polysilicate, sodium silicate, potassium silicate, rubidium silicate, cesium silicate or thallium silicate to a solution of quaternary ammonium silicate in a range of 5:1 to 1:19 by weight, and the ratio of, for example, the same to colloidal silica in a range of 20:1 to 1:4 by weight.

To the solution is then added an organic compound capable of undergoing Cannizzaro reaction as a gelling agent, such as, for example, formaldehyde, formamide, paraformaldehyde, glyoxal, ethyl acetate, ethyl formate, methyl formate, methyl acetate or the like. These components are mixed with agitation to forward the reaction slowly and the pH is uniformly lowered to polymerize silica or to cause phase separation and gelling. During the same time, it is required that the molar ratio of the organic materials except formamide, and the alkali metal oxides ($R_2O$) is 2 to 13 and the molar ratio of formamide and $R_2O$ is 0.67 to 13, since if less than 2 or 0.67, gelling is not sufficient and there is only obtained a gelled body breakable in the subsequent leaching step, while if more than 13, an uncontrollable gelling takes place in a moment. When the organic material is added in a diluted form, it is necessary to keep the quantity of $SiO_2$ in the solution at not less than 1 mol/l, and when using it in a thickened form, it is necessary to keep not exceeding the solubility although a serious obstacle does not occur even if it is used in excess.

The above described gelling temperature may be between the freezing point and the boiling point of the reaction solution, but when the reaction is carried out near the freezing point, 720 hours or more is taken for the completion of gelling, while several seconds is only taken near the boiling point. Therefore, gelling should be carried out at a temperature of 40° to 100° C. so that the gelling is completed within practically for several minutes to 24 hours. Such a gelling gives typically a linear contraction of 3 to 30% and when the concentration of an organic compound is high, volume change is small.

The gelled body obtained in this way is then leached by washing with water, or an aqueous solution of an organic material, e.g. alcohol, ketone, or organic acids, inorganic acids, or mixtures thereof, at a temperature ranging from room temperature to the boiling point of the leaching solution. In this case, for example, 1-5% $HNO_3$+95-99% $C_2H_5OH$ or 1 M $NH_4NO_3$ can preferably be used as a leaching solution. Thus, a porous glass body for molecular stuffing can be formed.

(B) Method by utilizing neutralization of silicic acid containing alkali metals

An aqueous solution containing at least one of lithium polysilicate, sodium silicate, potassium silicate, rubidium silicate, cesium silicate, thallium silicate, quaternary ammonium silicate and colloid silica with a predetermined concentration (preferably containing 0.01-1.0 g/ml of $SiO_2$) is firstly prepared, cooled and poured with vigorous agitation into a dilute acid such as dilute $HNO_3$, dilute $H_2SO_4$, dilute HCl, aqueous $H_2CO_3$, aqueous $H_3BO_3$, aqueous $H_3PO_4$, $CH_3COOH$ and HCOOH or a cooled acid containing other components, such as the sulfates and nitrates of aluminum, zinc, tin, lead, arsenic, antimony, etc. with a predetermined concentration.

The gelled body thus obtained and formed in a desired shape is then washed with tap water or an aqueous solution of a salt such as $NH_4NO_3$ or $NH_4Cl$ at a high temperature to leach out salts of alkalis and acids. Generally the leaching is carried out by washing with water, or an aqueous solution of an organic material, e.g. alcohol, ketone, or organic acids such as $CH_3COOH$, $HCOOH$, $C_5H_4O_5N_4$ (uric acid), etc., or inorganic acids such as dilute $HNO_3$, dilute $H_2SO_4$, dilute $HCl$, aqueous $H_2CO_3$, aqueous $H_3BO_3$, aqueous $H_3PO_4$, aqueous $NH_4NO_3$, aqueous $(NH_4)_2SO_4$, aqueous $NH_4Cl$, etc. or mixtures thereof at a temperature of from room temperature to the boiling point of the leaching liquor. After it is finally washed with pure water, there is obtained a porous glass with connected micropores and a desired shape.

Method of preparing a porous glass body consisting predominantly of $SiO_2$ and a porous glass body consisting predominantly of $Al_2O_3$-$SiO_2$ will now be illustrated as embodiments of the present invention:

Preparation of Porous Glass consisting predominantly of $SiO_2$ 500 ml of water glass ($SiO_2/Na_2O = 3.22$, $SiO_2 = 0.2$ g/ml) was poured in 1000 ml of water to form an aqueous solution at 5° C., added with agitation to an aqueous solution of dilute HCl at 5° C. (4.0 N-HCl 1245 ml + water 300 ml), and immediately cast into a vessel with a predetermined shape. In about two minutes, gelling took place at a pH of about 6.2 If necessary, the resulting gel can be cut in a desired shape after about 30 to 60 minutes.

The gelled body as cast or after being cut in a desired shape was then washed with an aqueous solution of 1 N $NH_4NO_3$ or aqueous solution of 1 N $NH_4Cl$ for 2 hours in a 3 l Büchner funnel and this washing was repeated three times, thus obtaining a porous glass consisting predominantly of $SiO_2$, e.g. in the form of a rod.

Preparation of Porous Glass consisting predominantly of $Al_2O_3$-$SiO_2$ 1130 ml of water glass ($SiO_2/Na_2O = 2.07$, $SiO_2 = 0.382$ g/ml) was poured into water to form 3000 ml of an aqueous solution and 16 g of $Al_2(SO_4)_3 \cdot 18H_2O$ and 150 ml of concentrated $H_2SO_4$ were poured into water to form 3000 ml of an aqueous solution. Then, 3000 ml of the above described aqueous water glass solution was with agitation, added to 3000 ml of the above described acidic aqueous solution, the pH being about 4.2. Immediately, the mixture was cast in a vessel with a desired shape and heated for several minutes, followed by gelling. If necessary, the resulting gel can be cut in a desired shape.

The gelled body as cast or after being cut in a desired shape was allowed to stand, immersed in 10 l of a 1% aqueous solution of $NH_4OH$ for one day and night, washed with water, further washed with 12 to 15 l of a 10% aqueous solution of $NH_4Cl$ at 70° C. for several hours and filtered. If necessary, this washing was repeated ten times. Thereafter, the gelled body was further washed with ammoniacal distilled water repeatedly two times and finally washed with distilled water three times, thus obtaining a porous glass consisting predominantly of $Al_2O_3$-$SiO_2$, e.g. in the form of a rod.

Thus, there is obtained a porous glass body for molecular stuffing.

(C) Method by utilizing neutralization of aqueous solution silicic acid

In this embodiment, firstly, an acidic aqueous solution of silicic acid or ammonium silicate is prepared. An alkaline aqueous solution of ammonium silicate can be used as it is. As well known in the art, an aqueous solution of silicic acid can for example be prepared as follows: A commecially sold aqueous solution of sodium silicate (e.g. containing 25% of $SiO_2$ and 6.8% of $Na_2O$ and having an $SiO_2/Na_2O$ weight ratio of 3.68) is passed through a cation exchange resin, for example, a sulfonated polystyrene copolymer of hydrogen type such as Rexyn 101, R 231 Cation Exchange Resin to thus obtain an aqueous silicic acid with a pH of 2 to 3. As well known in the art, an aqueous solution of ammonium silicate can for example be prepared as follows: A commercially sold aqueous solution of sodium silicate is passed through a cation exchange resin of $NH_4^+$ type to thus obtain an alkaline aqueous solution of ammonium silicate. For the preparation of an acidic aqueous solution of ammonium silicate, the acidification is preferably effected by the use of hydrochloric acid or carbon dioxide gas.

In this process, inorganic or organic compounds, for example, $NH_4Cl$, $(NH_4)_2CO_3$, $NH_4NO_3$, $(NH_4)_3BO_3$, $(NH_4)_3PO_4$, $CH_3COOH$, uric acid and the like, which do not become dopants capable of changing the refractive index, can be added.

The variety and concentration of such a compound as not taking part in the refractive index, as well as the variety and concentration of a compound becoming a dopant capable of changing the refractive index, have large influences upon the porosity, pore size and the concentration of silica or the ratio to silica. Therefore, in order to enlarge the porosity and pore size and to effect leaching at a high speed for example, it is desirable to add a compound of this type with a relatively large ratio to silica. The aqueous solution of silicic acid is neutralized and reacted at a temperature from the freezing point to the boiling point of the solution.

When using an acidic aqueous solution of silicic acid, an alkaline aqueous solution, for example, 1 M $NH_4OH$ solution is added to the acidic solution to adjust the pH to 4 to 6, for example, pH=5.0. At room temperature, a hard solid gel starts to precipitate from the solution in a relatively short time, i.e. 30 minutes or less. When using an alkaline solution containing silicic acid, an acidic aqueous solution, for example, 1 N $HNO_3$ is added to the alkaline solution to adjust the pH to 4 to 6 (with formation of $NH_4NO_3$ in dissolved state). At this time, gelling proceeds followed by ageing at a certain temperature, preferably 0°–100° C. (e.g. room temperature), in a suitable time.

A gelled body with a skeleton of porous silica obtained by the above described gelling is subjected to leaching with water, alcohols, ketones, organic acids, inorganic acids or their mixtures at a temperature ranging from room temperature to the boiling point to remove the excess compounds or salts thereof as described above. In this case, for example, 1–5% $HNO_3 + 95$–99% $C_2H_5OH$ or 1 M $NH_4NO_3$ can be used as a leaching solution. In this leaching step, the inorganic compounds, except silica, or organic compounds are gradually leached out from the gelled silica. The leaching speed depends on the variety of the ion, and organic materials are leached slowly.

Thus, there is obtained a porous glass body for molecular stuffing.

The technique of the second aspect of the present invention, i.e. molecular stuffing method, will be illustrated in the following.

The molecular stuffing method comprises immersing the foregoing porous glass in an aqueous solution containing a compound capable of being converted into an oxide dopant for largely increasing the refractive index, for example, $Cs_2O$, $Rb_2O$, $Tl_2O$ and other oxides, to permeate the connected micropores with the aqueous solution (stuffing step), lowering the temperature of the aqueous solution or changing the composition of the solution to decrease the solubility of the compound and to precipitate it in the connected micropores (precipitating step), then immersing in or washing with a solvent or solution capable of leaching the compound so that the compound is leached out of the glass body to give a predetermined concentration distribution (unstuffing step), and changing the composition of the solvent or solution and/or raising the temperature (reprecipitating step).

The precipitating step before leaching of the compound can be omitted if not necessary. When $Cs_2O$ is taken into consideration as an oxide dopant, $CsNO_3$ is suitable as the compound. A saturated aqueous solution of $CsNO_3$ at a high temperature is prepared, in which the foregoing porous glass is sufficiently immersed until the centers of the connected micropores are permeated therewith, and the porous glass is removed into water to give a white precipitate of $CsNO_3$ on the inner surfaces of connected micropores. When the porous glass is then immersed in an aqueous solution consisting of 60% $C_2H_5OH$-40% $H_2O$ at 70° C., the precipitated $CsNO_3$ is leached out of the surface. When the white precipitate of $CsNO_3$ at the central part disappears, the porous glass is taken out and removed into propanol at room temperature, whereby the $CsNO_3$ dissolved with a concentration distribution in the connected micropores is reprecipitated on the inner surfaces thereof. In the thus $CsNO_3$ reprecipitated porous glass, the concentration thereof is higher at the central part and is gradually lowered toward the outside to give a parabolic distribution.

In another example, unstuffing can be carried out with water at a suitable temperature, with an aqueous solution containing a compound which is evaporated in the subsequent step and is not doped, for example, $NH_4NO_3$, $(NH_4)_2CO_3$, $(NH_4)_2SO_4$, etc., by ion-exchangeably with an aqueous solution containing a compound becoming a dopant which does not so increase the refractive index, or somewhat decreases the refractive index when doped, for example, $K_2B_4O_7$, $K_3PO_4$, $H_3BO_3$, $H_3PO_4$, $NH_4HB_4O_7$, etc. When the latter is doped, the softening point of the glass is controlled uniformly. This is desirable in working the glass.

Then, the thus treated glass is slowly dried, preferably at a temperature of from room temperature to 500° C. with a temperature increase of e.g. 25° C./hr in vacuum, dry $O_2$ under sub-atmospheric pressure, He gas or mixed gases of (He+$O_2$) to evaporate water and organic compounds such as alcohol in the micropores, and further heated, preferably at a temperature of 500° to 800° C., particularly 550° to 650° C. with a temperature increase of e.g. 100° C./hr in a similar atmosphere, to decompose the compound into the corresponding oxide. Optionally with flowing oxygen gas, the glass is heated to evaporate or burn organic compounds and further heated at a higher temperature, for example, at 900° to 1450° C. in vacuum or in oxygen gas, He gas or (He+$O_2$) mixed gas under reduced pressure to collapse the micropores under surface tension, thus forming a transparent glass. The temperature increase during this step is e.g. 100° C./hr.

In the above described molecular stuffing process, the concentration distribution when the compound is leached (unstuffing step) depends on the shape of the porous glass body, the porosity and pore size, the ambient liquid and the temperature conditions.

As to the shape of the porous glass body in the case of the method (A), a mixture of a silicate solution and an organic compound mixed and stirred well is poured into a vessel having a desired shape, for example, a cylindrical plastic vessel, followed by gelling, thus obtaining a gelled body having a desired shape before leaching, or a previously gelled body is subjected to working, for example, by grinding into a cylindrical shape or polishing, thus obtaining a gelled body having, for example, a rod shape before leaching.

The porosity and pore size, after the leaching is completed, vary with the ratio of various alkalies to silica, the concentration of silica and the variety and concentration of an organic compound. For example, the pore size is 2000 Å to several microns in the case of using potassium silicate only, 100 Å in the case of using colloidal silica, 200 Å or less in the case of using quaternary ammonium silicate and a mean value of 100 to 2000 Å in the case of using their mixtures. The porosity ranges from 30% to 90%. The use of a solution containing an increased quantity of $SiO_2$ and a decreased quantity of an alkali results in a tendency of lowering the pore size and porosity. From the standpoint of the concentration of the solution, the pore size is decreased and the uniformity is improved by diluting it with water, but the gel strength when gelled is lowered. When the concentration of the organic compound is increased, the pore size is decreased, but the porosity is increased.

As to the shape in the case of the method (B) or (C), a solution of a silicate is neutralized with stirring with another solution and poured into a vessel having a desired shape, for example, a cylindrical plastic vessel, followed by stirring, thus obtaining a gelled body with a desired shape before leaching, or a previously gelled body is subjected to working, for example, by grinding into a cylindrical shape or polishing, thus obtaining a gelled body having, for example a rod shape before leaching.

The porosity and pore size, after the leaching is completed, vary with the ratio of various compounds to silica, the concentration of silica and the variety and concentration of the various compounds. For example, the use of a solution containing a decreased quantity of $SiO_2$ and an increased quantity of various compounds such as $NH_4Cl$ results in a tendency of increasing the pore size and porosity. From the standpoint of the concentration of the solution, the porosity is increased and the uniformity is improved by diluting it with water, but the gel strength when gelled is lowered. When the concentration of the organic compound is increased, the pore size is decreased similarly to the inorganic compound.

As to the unstuffing conditions, for example, in the case of using $CsNO_3$, the concentration distribution of $CsNO_3$ depends on the concentration of $CsNO_3$ in an aqueous solution of $CsNO_3$ before unstuffing and on the composition and temperature of the unstuffing solution during the unstuffing, since the solubility and diffusion coefficient of $CsNO_3$ vary with the temperature during the unstuffing and the composition of the unstuffing solution, e.g. molar ratio of $C_2H_5ON$ and $H_2O$.

In the above described process, $Al_2O_3$, $TiO_2$, $SiO_2$, $ZrO_2$, C, SiC, $Si_3N_4$, $V_2O_5$, $Cr_2O_3$, $Fe_2O_3$, CoO, NiO, CuO, MnO salts of Nd and Sm, and other oxides and compounds can be added, as a dispersing agent, to a solution of a silicate or silicic acid, but it is required that the dispersing agent has a size of at most 70 microns and is added in a proportion of 70% or less. In particular, glass bodies prepared by adding compounds of Nd and Sm can be used as a material for a laser. In addition to the alkali metal silicates set forth above, solutions of Mg, Ca, Sr and Ba silicates can be added in such a range that the foregoing conditions are not disordered.

As a compound for effecting the molecular stuffing, there can further be used compounds of Cs, Rb, Tl, etc., such as $CsNO_3$, $RbNO_3$ and $TlNO_3$, together with compounds of Ca, Sr, Ba, Pb, Bi, etc. in combination.

According to the process of the present invention, there can be obtained the advantages or merits summarized below:

(1) A cheap article can be produced because of cheap raw materials and a relatively simple and controllable process.

(2) A large porous glass article having a desired shape can be produced by carrying out gelling in a large vessel and subjecting the porous glass to molecular stuffing to thus give an article with a desired shape.

(3) Using a gelled body prepared from solutions of alkali metal silicates or silicic acid and acids or other liquors, there can be obtained a porous glass body which is uniform in each position and in which disorder of the refractive index is suppressed in each position.

(4) In the unstuffing step, by controlling the liquid composition and temperature condition around a spherical or cylindrical article, there can be obtained a glass article in which a dopant for a low refractive index is increased outwardly or a dopant for a high refractive index is decreased outwardly, and the distribution of the refractive index is lowered outwardly with a predetermined curve. In particular, where the distribution of the refractive index is lowered outwardly in the form of a parabolic distribution for a cylindrical form, a material for a rod lens of self-convergence type can be produced.

(5) The dispersion of refractive index can be decreased by effecting molecular stuffing in such a manner that dopants in suitable amounts are distributed while keeping the refractive index in a desired form using $Tl_2O$, $Cs_2O$ and $Rb_2O$ as a dopant for a higher refractive index, $B_2O_3$ and F as a dopant for a lower refractive index and $Li_2O$, $Na_2O$ and $K_2O$ as a dopant for an intermediate refractive index. In addition, the use of a porous glass with a large porosity results in an increased quantity of doping and a large distribution of the refracive index.

(6) An Nd- or Sm-doped glass suitable for use as a material for a laser can be produced by adding a compound of Nd or Sm to a solution of a silicate.

The following examples are given in order to illustrate the present invention in more detail without limiting the same, in which percents are to be taken as those by weight unless otherwise indicated.

EXAMPLE 1

A mixture of a quaternary ammonium silicate solution consisting of 10% $NH_4^+$-45% $Si_2O$-balance $H_2O$ and a cesium silicate solution consisting of 8% $Cs_2O$-20% $SiO_2$-balance $H_2O$ in a proportion of 30%-70% by volume was prepared, mixed with 10 g of formamide per 100 g of the alkali silicate, stirred and poured in a cylindrical teflon vessel of 20 mm$\phi \times$50 mmH. After allowed to stand at room temperature for one night, a gelled body (17 mm$\phi \times$45 mmH) was taken out of the vessel and washed with 1 M $NH_4NO_3$ solution at 100° C. for 24 hours.

The thus obtained porous glass was immersed and held in a saturated aqueous solution of $CsNO_3$ at 80° C. for 8 hours, taken out, immersed in water at 20° C. for 2 minutes to precipitate white $CsNO_3$ in the micropores, and then immersed in a solution consisting of 60% $C_2H_5OH$-40% $H_2O$ at 70° C. for 4 hours. When the porous glass body became gradually clear from the outside and the white precipitate at the central part disappeared, it was immediately immersed in a solution of PrOH at 4° C. to reprecipitate $CsNO_3$ in the micropores, then further immersed in a solution of PrOH at 0° C., allowed to stand therein for one night, dried gradually under reduced pressure, heated slowly up to 600° C. while a mixed gas of 80 volume % He-20 volume % $O_2$ started to flow after the temperature exceeded 100° C., and further heated up to 1100° C. to thus obtain a transparent glass rod of 13 mm$\phi$. The resulting glass rod was drawn into a rod of 2 mm$\phi$, cut in a length of ¼×(pitch length) and polished to prepare a rod lens. For the assessment of the light-condensing property, this rod lens was inserted between a large core diameter fiber of NA=0.15 and a fiber to measure the insertion loss, which was less than 2 dB.

EXAMPLE 2

A mixed aqueous solution of 345 ml of a commercially sold aqueous solution of sodium silicate and 1555 ml of distilled water was passed through an ion exchange column filled with a cation exchange resin of Rexyn 101, R 231 to prepare an aqueous solution of silicic acid ($SiO_2$=about 6.6%; pH=2.5). This solution was then poured in a cylindrical teflon vessel of 20 mm$\phi \times$50 mmH, to which $NH_4NO_3$ was added to give an $NH_4NO_3/SiO_2$ weight ratio of 0.3, followed by mixing. Thereafter, 1 N $NH_4OH$ was added thereto with agitation to adjust the pH to 5.5. After allowed to stand at room temperature for one night, a gelled body was taken out of the vessel and washed with pure water at 100° C. for 24 hours.

The thus resulting porous glass was immersed and held in an aqueous solution of $CsNO_3$ in saturated concentration at 80° C. for 8 hours, taken out, immersed in water at 20° C. for 2 minutes to precipitate white $CsNO_3$ in the micropores, and then immersed in a solution consisting of 60% $C_2H_5OH$-40% $H_2O$ at 70° C. for 4 hours. When the glass body became gradually clear from the outside and the white precipitate at the central part disappeared, it was immediately immersed in a solution of PrOH at 4° C. to reprecipitate $CsNO_3$ in the micropores, and then further immersed and held in a solution of PrOH at 0° C. for one night. The immersed porous glass body was dried gradually under reduced pressure, heated slowly up to 600° C. while a mixed gas of 80 volume % He-20 volume % $O_2$ started to flow after the temperature exceeded 100° C., and further heated up to 1100° C. to thus obtain a transparent glass rod of 13 mm$\phi$. The resulting glass rod was drawn into a rod of 2 mm$\phi$, cut in a length of 4/1×(pitch length) and polished to prepare a rod lens. For the assessment of the light-condensing property, this rod lens was inserted between a large core diameter fiber of NA=0.15 and a fiber to measure the insertion loss, which was less than 1.5 dB.

EXAMPLE 3

A mixed aqueous solution of 345 ml of a commercially sold aqueous solution of sodium silicate and 1555 ml of distilled water was passed through an ion exchange column filled with a cation exchange resin of $NH_4$ type to prepare an aqueous solution of ammonium silicate. This solution was poured in a cylindrical teflon vessel of 20 mm$\phi \times$ 50 mmH and the pH was adjusted to 5.0 using 1 M $HNO_3$. Then, $NH_4NO_3$ was added thereto to give an $NH_4NO_3/SiO_2$ weight ratio of 0.3 and further 1 N $NH_4OH$ was with agitation added to adjust the pH to 5.0. After allowed to stand at room temperature for one night, a gelled body was taken out of the vessel and leached with water at 80° C. for 48 hours.

Thereafter, the procedure of Example 2 was repeated to prepare a rod lens having similar properties.

EXAMPLE 4

An aqueous solution of ammonium silicate was prepared in an analogous manner to Example 3 and poured in a cylindrical teflon vessel, to which $CsNO_3$ was added so as to give a $CsNO_3/SiO_2$ weight ratio of 0.4, followed by mixing. Then, 0.5 M $HNO_3$ was with agitation added thereto to adjust the pH to 5.0. After allowed to stand at room temperature for one night, a gelled body was taken out of the vessel and immersed in pure water at 100° C. for 50 hours.

Thereafter, the procedure of Example 3 was repeated to prepare a rod lens having similar properties.

EXAMPLE 5

1130 ml of a water glass solution with $SiO_2/Na_2O=2.07$ and $SiO_2=0.38$ g/ml was prepared and diluted to 3000 ml to obtain a solution (A), while 80 g of $Al_2(SO_4)_3$ and 90 ml of concentrated sulfuric acid were mixed and diluted with water to 3000 ml to obtain a solution (B). While keeping the temperature at 5° C., the solution (A) was added to the solution (B) with agitation, the addition of the first half being effected slowly and that of the second half being effected at once, and the pH was about 4.5. The mixture was immediately poured in a cylindrical teflon vessel of 20 mm$\phi \times$ 50 mmH, held therein for three days and nights, then immersed in 10 l of a 1% aqueous solution of $NH_4OH$ for one day and night, washed with city water, heated at 70° C. in 15 l of a 10% aqueous solution of $NH_4Cl$ for several hours, the washing being repeated about ten times, and then washed with distilled water one time.

The thus resulting porous glass was immersed and held in a saturated aqueous solution of $CsNO_3$ at 80° C. for 8 hours, taken out, immersed in water at 20° C. for 2 minutes to precipitate white $CsNO_3$ in the fine pores, and then immersed in a solution consising of 60% $C_2H_5OH$-40% $H_2O$ at 70° C. for 4 hours. When the glass became gradually clear from the outside and the white precipitate at the central part disappeared, it was immediately immersed in a solution of PrOH at 4° C. to reprecipitate $CsNO_3$ in the micropores, and then further immersed and held in a solution of PrOH at °C. for one night. Thereafter, the immersed porous glass body was dried gradually under reduced pressure, heated slowly up to 600° C. while a mixed gas of 80 volume % He-20 volume % $O_2$ started to flow after the temperature exceeded 100° C., and further heated up to 1100° C. to thus obtain a transparent glass rod of 13 mm$\phi$. The resulting glass rod was drawn into a rod of 2 mm$\phi$, cut in a length of $\frac{1}{4} \times$ (pitch length) and polished to prepare a rod lens. For the assessment of the light-condensing property, this rod lens was inserted between a large core diameter fiber of NA=0.15 and a fiber to measure the insertion loss, which was less than 2 dB.

What is claimed is:

1. A process for producing an optical glass article, which comprises
   preparing at least two solutions having a pH of 10 to 15 and an $SiO_2$ content of about 1 to 12 mols/l and containing at least one silicate selected from the group consisting of lithium polysilicate, sodium silicate, potassium silicate, rubidium silicate, cesium silicate, thallium silicate, quaternary ammonium silicate and colloidal silica,
   combining these solutions to form a mixed solution,
   reacting the mixed solution with at least one organic compound selected from the group consisting of formaldehyde, paraformaldehyde, formamide, glyoxal, methyl formate, ethyl formate, methyl acetate and ethyl acetate at a temperature from the freezing point to the boiling point of the reaction solution in a time sufficient to polymerize silica and form a porous gelled body,
   leaching the porous gelled body with a leaching solution selected from the group consisting of water, an aqueous solution of an inorganic acid and an aqueous solution of an organic material, capable of dissolving residues in the porous gelled body, until the leaching reaches the central part of the porous gelled body, to form a porous glass body having micropores therein,
   stuffing the porous glass body with a solution containing at least one compound capable of being converted into an oxide dopant for changing the refractive index of the porous glass body, selected from the group consisting of $CsNO_3$, $RbNO_3$ and $TlNO_3$,
   unstuffing the porous glass body with a solvent or solution having a suitable composition at a suitable temperature to leach the compound out of the porous glass body so as to give a predetermined concentration distribution of the compound in the micropores,
   precipitating the compound in the micropores,
   drying the glass body in a predetermined atmosphere to decompose the compound,
   further heating the glass body at a higher temperature, and
   firing the glass body at a temperature sufficiently high to completely decompose the compound and to completely burn any organic materials in the glass body, but lower than the melting point of silica.

2. A process for producing an optical glass article, which comprises
   preparing an aqueous solution containing at least one silicate selected from the group consisting of lithium polysilicate, sodium silicate, potassium silicate, rubidium silicate, cesium silicate, thallium silicate, quaternary ammonium silicate and colloidal silica,
   preparing a dilute acid,
   mixing and stirring the aqueous solution of the silicate and the dilute acid to form a porous gelled body,
   leaching the porous gelled body with a leaching solution selected from the group consisting of water, an aqueous solution of an inorganic acid and an aqueous solution of an organic material, capable of dissolving residues in the porous gelled body, until the leaching reaches the central part of the porous gelled body, to form a porous glass body having micropores therein, stuffing the porous glass body with a solution containing at least one compound capable of being converted into an oxide dopant for changing the refractive index of the porous glass body, selected from the group consisting of $CsNO_3$, $RbNO_3$ and $TlNO_3$, unstuffing the porous glass body with a solvent or solution having a suitable composition at a suitable temperature to leach the compound out of the porous glass body so as to give a predetermined concentration distribution of the compound in the micropores, precipitating the compound in the micropores, drying the glass body in a predetermined atmosphere to decompose the compound, further heating the glass body at a higher temperature, and firing the glass body at a temperature sufficiently high to completely decompose the compound and to completely burn any organic materials in the glass body, but lower than the melting point of silica.

3. A process for producing an optical glass article, which comprises preparing an aqueous solution containing silicic acid, neutralizing and reacting the aqueous solution containing silicic acid at a temperature from the freezing point to the boiling point of the solution in a period of time sufficient to polymerize silica and form a porous gelled body, leaching the porous gelled body with a leaching solution selected from the group consisting of water, an aqueous solution of an inorganic acid and an aqueous solution of an organic material, capable of dissolving residues in the porous gelled body, until the leaching reaches the central part of the porous gelled body, to form a porous glass body having micropores therein, stuffing the porous glass body with a solution containing at least one compound capable of being converted into an oxide dopant for changing the refractive index of the porous glass body, selected from the group consisting of $CsNO_3$, $RbNO_3$ and $TlNO_3$, unstuffing the porous glass body with a solvent or solution having a suitable composition at a suitable temperature to leach the compound out of the porous glass body so as to give a predetermined concentration distribution of the compound in the micropores, precipitating the compound in the micropores, drying the glass body in a predetermined atmosphere to decompose the compound, further heating the glass body at a higher temperature, and firing the glass body at a temperature sufficiently high to completely decompose the compound and to completely burn any organic materials in the glass body, but lower than the melting point of silica.

4. The process of claim 1, wherein the molar ratio of the organic compound, except formamide, to alkali metal oxide ($R_2O$) in the silicate is 2 to 13.

5. The process of claim 1, wherein the molar ratio of formamide to alkali metal oxide in the silicate is 0.67 to 13.

6. The process of claim 1, wherein the reaction to form the porous gelled body is carried out at 40° to 100° C.

7. The process of claim 1, wherein the leaching solution is a solution of 1–5% $HNO_3$ + 95–99% $C_2H_5OH$.

8. The process of claim 1, wherein the leaching solution is a solution of 1 M $NH_4NO_3$.

9. The process of claim 2, wherein the dilute acid contains a metal salt.

10. The process of claim 2, wherein the dilute acid is selected from the group consisting of dilute $HNO_3$, dilute $H_2SO_4$, dilute HCl, aqueous $H_2CO_3$, aqueous $H_3BO_3$, aqueous $H_3PO_4$, acetic acid and formic acid.

11. The process of claim 2, wherein the leaching solution is an aqueous solution of an organic acid or inorganic acid.

12. The process of claim 11, wherein the organic acid is selected from the group consisting of acetic acid, formic acid and uric acid.

13. The process of claim 11, wherein the inorganic acid is selected from the group consisting of dilute $HNO_3$, dilute $H_2SO_4$, dilute HCl, aqueous $H_2CO_3$, aqueous $NH_4NO_3$, aqueous $(NH_4)_2SO_4$, aqueous $NH_4Cl$, aqueous $H_3BO_3$ and aqueous $H_3PO_4$.

14. The process of claim 9, wherein the metal salt is selected from the group consisting of sulfates and nitrates of Al, Zn, Sn, Pb, As and Sb.

15. The process of claim 1, which further comprises immersing the unstuffed body in an organic solvent before precipitating the compound in the micropores.

16. The process of claim 3, wherein the aqueous solution containing silicic acid is an acidic aqueous solution of silicic acid or an acidic aqueous solution of ammonium silicate.

17. The process of claim 16, wherein the acidic aqueous solution of silicic acid is prepared by passing an aqueous solution of sodium silicate through a cation exchange resin.

18. The process of claim 16, wherein the acidic aqueous solution of ammonium silicate is prepared by passing an aqueous solution of sodium silicate through a cation exchange resin of the $NH_4^+$ type and acidifying the resultant solution with hydrochloric acid or carbon dioxide gas.

19. The process of claim 3, wherein the neutralizing is carried out to a pH of 4 to 6.

20. The process of claim 3, wherein the leaching is carried out at a temperature of from room temperature to the boiling point of the leaching solution.

21. The process of claim 3, wherein the leaching solution is 1–5% $HNO_3$ + 95–99% $C_2H_5OH$.

22. The process of claim 3, wherein the leaching solution is 1 M $NH_4NO_3$.

23. The process of claim 1, wherein between the stuffing and unstuffing steps, precipitating is carried out by lowering the temperature of the stuffing solution or by changing the composition of the stuffing solution.

24. The process of claim 1, wherein the precipitating after the unstuffing step is carried out by changing the composition of the solvent or solution or by raising the temperature.

25. The process of claim 1, wherein the solvent for the unstuffing step is water.

26. The process of claim 1, wherein the solution for the unstuffing step is an aqueous solution containing at least one compound selected from the group consisting of $NH_4NO_3$, $(NH_4)_2CO_3$ and $(NH_4)_2SO_4$.

27. The process of claim 1, wherein the solution for the unstuffing step is an aqueous solution containing at least one compound selected from the group consisting of $K_2B_4O_7$, $K_3PO_4$, $H_3PO_4$, $H_3BO_3$ and $NH_4HB_4O_7$.

28. The process of claim 1, wherein the predetermined atmosphere in the drying step is selected from the group consisting of a vacuum, dry $O_2$ under sub-atmospheric pressure, He gas and mixture of He and $O_2$ gases.

29. The process of claim 1, wherein the drying is carried out at a temperature of from room temperature to 500° C.

30. The process of claim 1, wherein the heating after drying is carried out at a temperature of 500° to 800° C.

31. The process of claim 1, wherein the heating after drying is carried out in an atmosphere selected from the group consisting of a vacuum, $O_2$ gas, He gas, and a mixture of He and $O_2$.

32. The process of claim 1, wherein the firing is carried out at a temperature of 900° to 1450° C.

33. The process of claim 1, wherein the firing is carried out in an atmosphere selected from the group consisting of a vacuum, $O_2$ gas, He gas and a mixture of He and $O_2$.

34. The process of claim 2, which further comprises immersing the unstuffed body in an organic solvent before precipitating the compound in the micropores.

35. The process of claim 3, which further comprises immersing the unstuffed body in an organic solvent before precipitating the compound in the micropores.

36. The process of claim 3, wherein the aqueous solution containing silicic acid further contains, dissolved therein, another water-soluble inorganic or organic compound.

37. The process of claim 30, wherein the heating is carried out at a temperature of 550° to 650° C.

* * * * *